Figure 1:
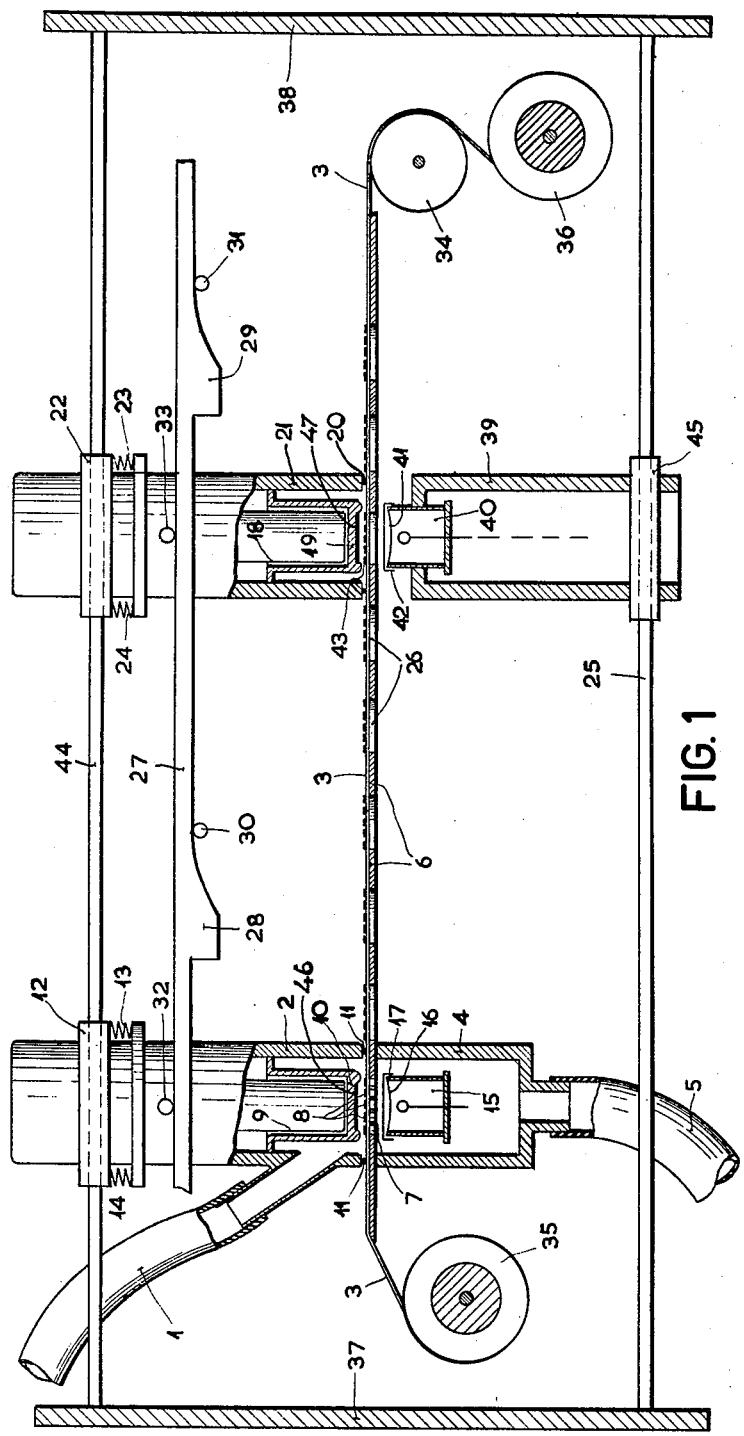

INVENTOR
JACOB HENDRIK SPAA

Oct. 29, 1963 J. H. SPAA 3,109,096
SYSTEM FOR DETERMINING THE RADIO-ACTIVITY OF GAS SOLS
Filed Sept. 1, 1959 2 Sheets-Sheet 2

INVENTOR
Jacob Hendrik Spaa
BY

United States Patent Office 3,109,096
Patented Oct. 29, 1963

3,109,096
SYSTEM FOR DETERMINING THE RADIO-ACTIVITY OF GAS SOLS
Jacob Hendrik Spaa, Emmasingel, Eindhoven, Netherlands, assignor to North American Philips Company Inc., New York, N.Y., a corporation of Delaware
Filed Sept. 1, 1959, Ser. No. 837,541
Claims priority, application Netherlands Sept. 2, 1958
5 Claims. (Cl. 250—83.3)

The present invention relates to systems for determining the radio-activity of gas sols comprising a device for determining the intensity of alpha-radiation and a device for determining the intensity of beta-radiation.

The radio-activity of gas sols partially originates from the natural radio-active gases radon and thoron and their daughter- or disintegration-products which adhere to the gas sol, and partially from contaminations of the gas concerned. In determining the radio-activity of gas sols, the natural radio-active gases produce a background which initially far exceeds the effect of the most offensive contamination. Hence, the latter cannot be determined immediately and consequently not in time. If the radio-activity from contamination is to be determined, means should be provided to distinguish such radio-activity from that originating from the natural radio-active gases.

In order to determine the radio-activity of a gas sol, the latter is separated from the gas, for example by filtration or electrostatic precipitation. The residue of a natural radio-active gas emits alpha- and beta-rays which very shortly reach a condition of equilibrium such that the ratio between the intensities of beta-radiation and alpha-radiation is constant. For radon it takes about 15 minutes and for thoron about 20 minutes. In the case of radon, the ratio between the total number of counts due to the beta-radiation and that due to alpha-radiation in the residue of the gas sol is approximately 1.4, whereas the ratio for thoron is 1.9. In air, the thoron content usually amounts to 4% to 10% of the radon content. In determining the radio-activity of an aerosol resulting from contaminations, it is consequently possible to allow for the radio-activity from the daughter-products of radon. If the ratio between beta-radiation and alpha-radiation differs from 1.4 radiation from contaminations is present. Very often it is sufficient to make allowance only for the daughter-products of radon, since the thoron content in air is far smaller and, moreover, the mean half life of the daughter-products of radon is half an hour and that of thoron ten hours. Also for this reason, the radio-activity from thoron is low the first hour during and after accumulation of the aerosol.

When the radio-activity of the residue of an aerosol is assessed several hours after accumulation, the radio-activity from thoron and its daughter-products is no longer negligible relative to that of radon. This is also true if, in certain circumstances, the thoron content of the air is above normal, in which case the system set out above does not permit of accurately distinguishing the radio-activity of an aersol resulting from contamination. In contrast, the system to be described in accordance with the invention, permits the determination of radio-active contamination despite the limitations set forth above.

The system according to the invention comprises selective absorption means through which the radiation passes prior to detection and the joint absorption capacities for either alpha or beta type of radiation are such that the ratio between detected beta-particles and detected alpha-particles for the daughter-products of radon corresponds to that for the daughter-products of thoron. If, in determining the radio-activity of a gas sol the ratio between detected beta-particles and detected alpha-particles is different from the ratio concerned, then there is radiation resulting from contamination. The initial concentration of thoron does not affect this system.

The system according to the invention more particularly comprises as absorption means one or more foils, the absorption capacities of which are matched to the absorption capacities of the remaining absorption means.

These remaining absorption means are, for example, the mica window of a counter tube, air and filtering paper.

A system is to be preferred in which the joint absorption capacity of the absorption means, through which the beta-radiation has to pass prior to detection, is so chosen and matched to the joint absorption capacity of the absorption means through which the alpha-radiation has to pass prior to detection, that the ratio between detected beta-particles and detected alpha-particles for the daughter-products of radon corresponds to that for the daughter-products of thoron. As a matter of fact, beta-radiation from $^{212}$Pb(ThB) can be readily absorbed and this far more easily than any beta-radiation from daughter products of radon, which permits the number of detected particles of this radiation to be reduced so that the ratio of detected beta-particles and detected alpha-particles for the thoron series corresponds to that for the radon series. In this embodiment, therefore an absorbing filter for the ThB beta radiation is provided in front of the beta-detector to reduce the number of detected particles. The absorbing filter also reduces the number of detected particles originating from the radon series although to a smaller extent. The beta-alpha detected ratios for thoron and radon are both lowered, the former more than the latter, and are thereby made equal.

The present invention also concerns a method of determining the radio-activity of gas sols associated with the system set out above.

In order that the invention may be readily carried into effect, an example of a system for determining the radio-activity of gas sols is schematically shown in FIG. 1 of the accompanying drawing which is a sectional view.

Figure 2:
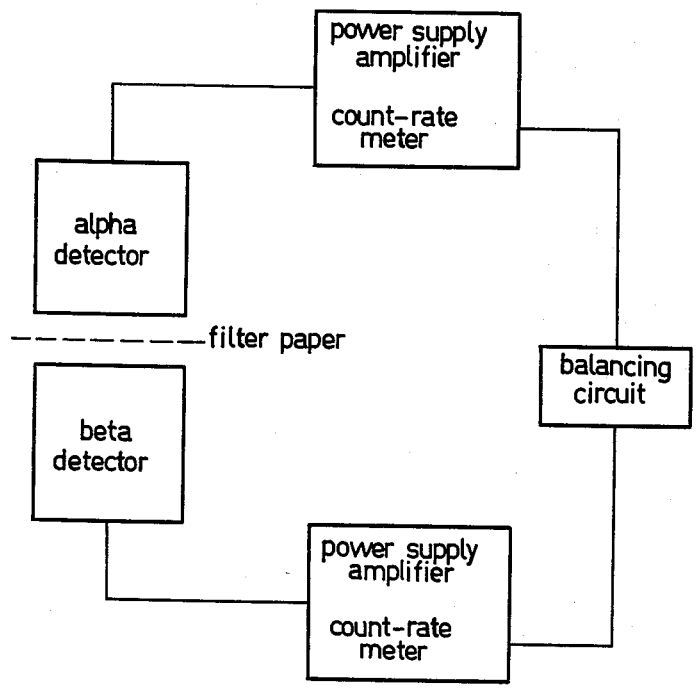

FIG. 2 is a block diagram of a measuring apparatus for making use of the invention.

In FIG. 1 the gas to be tested is pumped through tubing 1 into the inlet tube 2. Subsequently it passes through filter-paper 3. The gas leaves the system through the outlet tube 4 and tubing 5. The filter-paper 3 rests on a support 6 which, between the inlet tube and the outlet tube 4, is provided with holes 7 for the passage of the gas. Deposit 8 accumulates on the filter-paper. Above the area where the deposit 8 accumulates, the inlet tube 2 contains an alpha-counter consisting of a photo-multiplier tube 9 and a light-conductor 10 consisting of acrylic resin, provided with a thin luminescent layer 46 of ZnS:Ag crystals for converting the impinging alpha-particles into light for activating the photo-multiplier 9. This layer is not provided with a light-screen and the air space between the layer and the deposit is only a few millimeters, thus ensuring an optimum counting effect. The inlet tube 2 is provided with rubber tubing 11 and is vertically movable in a holder 12. Springs 13 and 14 press the inlet tube 2 on the holder 6 so as to obtain a gas-tight and light-tight closure. A Geiger-counter tube 15 having a mica window 16 at one end is provided in the outlet tube 4 below the support. Between the deposit 8 and the mica window 16 of the Geiger-counter tube 15 provision is made of paper foil 17, which serves as the main absorber of ThB beta-radiation. In order to determine the radio-activity of the deposit, if the activity of the natural background has decayed for a number of hours, there is provided a second set of detectors. The photo-multiplier tube 18 with the luminescent layer 47 and the light-conductor 19 permits the alpha-activity to be determined. Below the support 6 a Geiger-counter tube 40 having a mica window 41 at one end is provided inside the tube 39. Between the deposit 43 and the mica window 41 of the Geiger-counter tube 40 provision is made of a paper foil 42. A rubber ring 20 provides an air-tight seal between the support 6 and the tube 21. For this purpose, the tube 21 is vertically movable in the holder 22 and is pressed on the support 6 by means of springs 23, 24. Since the holder 22 is displaceable along two bars 44, and the holder 45 is movable along two bars 25, measurements can be made at several points, namely, where the support 6 possesses holes 26. As shown in FIG. 2, suitable counter or scaler circuits are coupled to each of the alpha and beta detectors, and then a suitable circuit or indicator is provided to measure or indicate the disturbance of the balance between the total number of accumulated counts of these two detectors.

In order to displace the filter-paper 3, the pumping of the gas is interrupted and the high voltage for the photomultiplier tubes is switched off. After a few seconds, the tubes 2 and 21 are lifted by moving the bar 27 to the right so that lugs 28, 29 pass over fixed points 30 and 31, thus lifting the supports 32, 33 and consequently also the tubes 2 and 21. The filter-paper is then moved over a given distance by means of the rubber roller 34 and wound from the reel 35 on the reel 36. Subsequently, the tubes 2 and 21 are lowered by moving the rod 27 to the left. Next, the high voltage for the photomultiplier tubes and the pump is again applied. The two bars 44 and the two bars 25 are rigidly connected to plates 37 and 38 jointly constituting a rigid frame. The transport of the paper and further actuation of the system is effected by means of one motor. A ratio between detected beta-particles and detected alpha-particles corresponding for the daughter-products of radon to that for the daughter-products of thoron was, for example obtained by means of filter-paper 3 having a half value thickness of 6 mg./cm.$^2$, a paper foil 17 (42) having a half value thickness of 8 mg./cm.$^2$ and a mica window 16 (41) having a half value thickness of 3 mg./cm.$^2$. The spaces between the deposit 8 and the scintillating layer 46 and between the filter-paper 3 and the paper foil 17 were filled with air. The space between the deposit 8 and the scintillating layer 46 amounted to about 4 millimeters and that between the filter-paper 3 and the paper foil 17 amounted to about 5 millimeters. Due to the fact that the total counter efficiencies of the two detectors were unequal the ratio between detected alpha-particles and detected beta-particles amounted to 0.7.

FIG. 2 shows a block diagram of a measuring apparatus for making use of the invention. Each of the two detectors is coupled to a power supply amplifier and count-rate meter. Balancing circuit is coupled to the two count-rate meters. The balancing circuit indicates the disturbance of the balance between the total number of accumulated counts of the two detectors.

What is claimed is:

1. A system substantially independent of the time of measurement for determining the radio-activity of gas sols, at least part of said radio-activity being attributed to the presence and disintegration of the natural radio-active gases of radon and thoron associated with said sols, said system comprising means for supporting a specimen of the gas being determined for said radio-activity, at least one pair of first and second radiation detection means, said first and second detection means being adapted to detect alpha and beta particles, respectively, generated from said specimen, first radiation absorption means having a predetermined first radiation absorption characteristic disposed in the radiation path between said specimen and said first detection means, and second radiation absorption means having a predetermined second radiation absorption characteristic disposed in the radiation path between said specimen and said second detection means, each of said first and second absorption characteristics being selected to provide a ratio between the detected beta particles and the detected alpha particles for the daughter products of said radon substantially similar to the corresponding ratio for the daughter products of said thoron.

2. A system according to claim 1 wherein said second radiation absorption characteristic of said second radiation absorption means is sufficient to reduce the ratio of detected beta to detected alpha particles for the daughter products of thoron to render said ratios substantially equal.

3. A system according to claim 1 further comprising indicating means having first and second counter means responsive, respectively, to the respective output signals of said first and second detector means, and balanced circuit means coupled to said first and second counter means to provide an indicating signal proportional to the counter signals applied thereto.

4. A system as set forth in claim 1 wherein the beta absorbing means comprises a foil.

5. A system as set forth in claim 1 wherein the alpha detector is arranged on one side of the specimen and the beta detector is arranged on the other side of the specimen.

References Cited in the file of this patent

UNITED STATES PATENTS

| | | |
|---|---|---|
| 2,785,314 | Grahame | Mar. 12, 1957 |
| 2,806,147 | Stellmacher et al. | Sept. 10, 1957 |
| 2,826,076 | Boretz et al. | Mar. 11, 1958 |
| 2,892,091 | Sawle | June 23, 1959 |